United States Patent
Cruz et al.

(10) Patent No.: US 8,634,764 B2
(45) Date of Patent: Jan. 21, 2014

(54) REPEATER SYSTEM WITH TRANSPARENT ANTENNA INTEGRATED INTO A GLASS PANE

(75) Inventors: Eduardo Motta Cruz, Saint Herblain (FR); Vincent Hayart, Vertou (FR); Mohamed Himdi, Rennes (FR); Franck Colombel, Montfort sur Meu (FR); Jean-Philippe Dessarce, Pontoise (FR)

(73) Assignee: Bouygues Telecom, Boulogne Billiancourt (FR)

( * ) Notice: Subject to any disclaimer, the term of this patent is extended or adjusted under 35 U.S.C. 154(b) by 781 days.

(21) Appl. No.: 12/148,995

(22) Filed: Apr. 24, 2008

(65) Prior Publication Data

US 2009/0047900 A1 Feb. 19, 2009

(30) Foreign Application Priority Data

Apr. 26, 2007 (FR) ...................................... 07 54710

(51) Int. Cl.
*H04B 7/14* (2006.01)

(52) U.S. Cl.
USPC ........ 455/7; 455/33.3; 455/562.1; 455/575.7; 455/129; 455/274; 370/75; 370/274; 370/315; 370/492; 370/501; 343/700; 343/765; 343/795

(58) Field of Classification Search
None
See application file for complete search history.

(56) References Cited

U.S. PATENT DOCUMENTS

| | | | |
|---|---|---|---|
| 4,886,526 A * | 12/1989 | Joannou | 96/67 |
| 6,653,980 B2 * | 11/2003 | Ceccom et al. | 343/705 |
| 7,119,751 B2 * | 10/2006 | Li et al. | 343/713 |
| 2002/0028655 A1 * | 3/2002 | Rosener et al. | 455/16 |
| 2003/0098791 A1 * | 5/2003 | Carlson et al. | 340/547 |
| 2003/0142018 A1 | 7/2003 | Lange | |
| 2004/0176027 A1 | 9/2004 | O'Neil | |
| 2005/0130426 A1 * | 6/2005 | Hidaka et al. | 438/689 |
| 2006/0262026 A1 * | 11/2006 | Gainey et al. | 343/795 |
| 2007/0034081 A1 * | 2/2007 | Kurasek | 96/44 |
| 2007/0097009 A1 * | 5/2007 | Torres | 343/795 |
| 2007/0241971 A1 * | 10/2007 | Tsujimura et al. | 343/702 |

FOREIGN PATENT DOCUMENTS

| | | | |
|---|---|---|---|
| EP | 1657778 A | 5/2006 | |
| JP | 11-122023 A | 4/1999 | |
| WO | WO-02/095866 A | 11/2002 | |
| WO | WO-2004/088787 A | 10/2004 | |

* cited by examiner

*Primary Examiner* — Yuwen Pan
*Assistant Examiner* — Fanghwa Wang
(74) *Attorney, Agent, or Firm* — Blakely Sokoloff Taylor & Zafman

(57) ABSTRACT

The invention relates to a repeater system (1) for relaying the exchanges between a base station mobile telecommunication network and a user terminal, comprising an outside antenna (10) that can communicate with the base station, as well as retransmission means (20) connected to the outside antenna, wherein the retransmission means (20) are designed to act as the interface between the outside antenna (10) and an inside antenna (30) that can communicate with the user terminal to retransmit the signals received by either one of the antennae destined for the other antenna, characterized in that the outside antenna is an optically transparent planar antenna integrated into an optically transparent panel (2) used for the indoor lighting of a building.

11 Claims, 3 Drawing Sheets

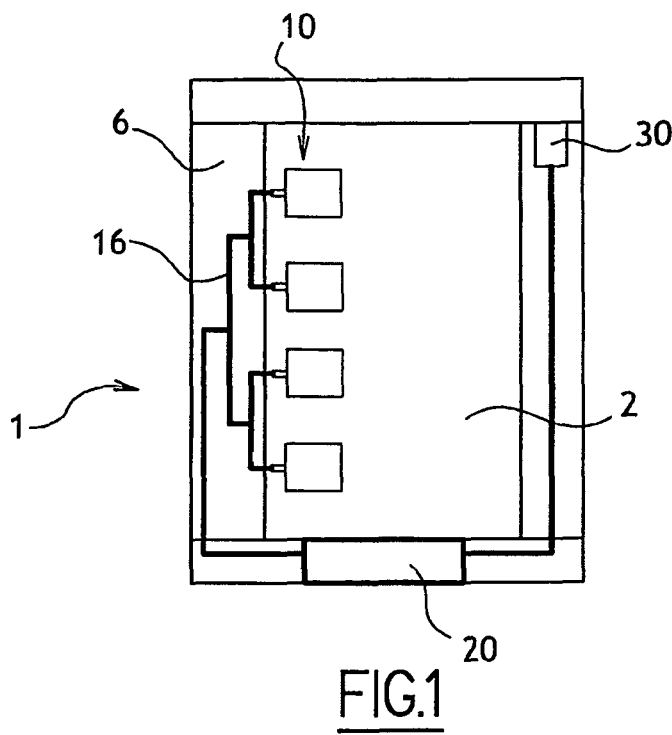
FIG.1
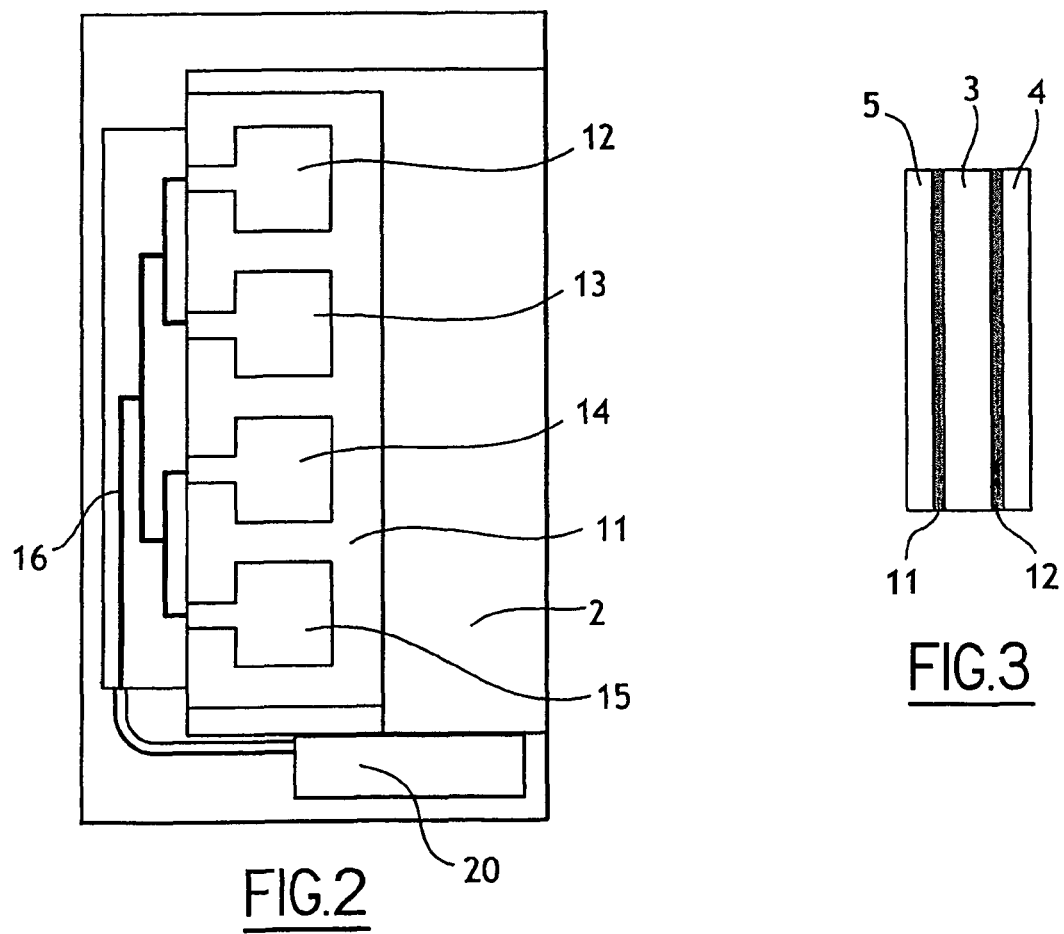
FIG.2
FIG.3

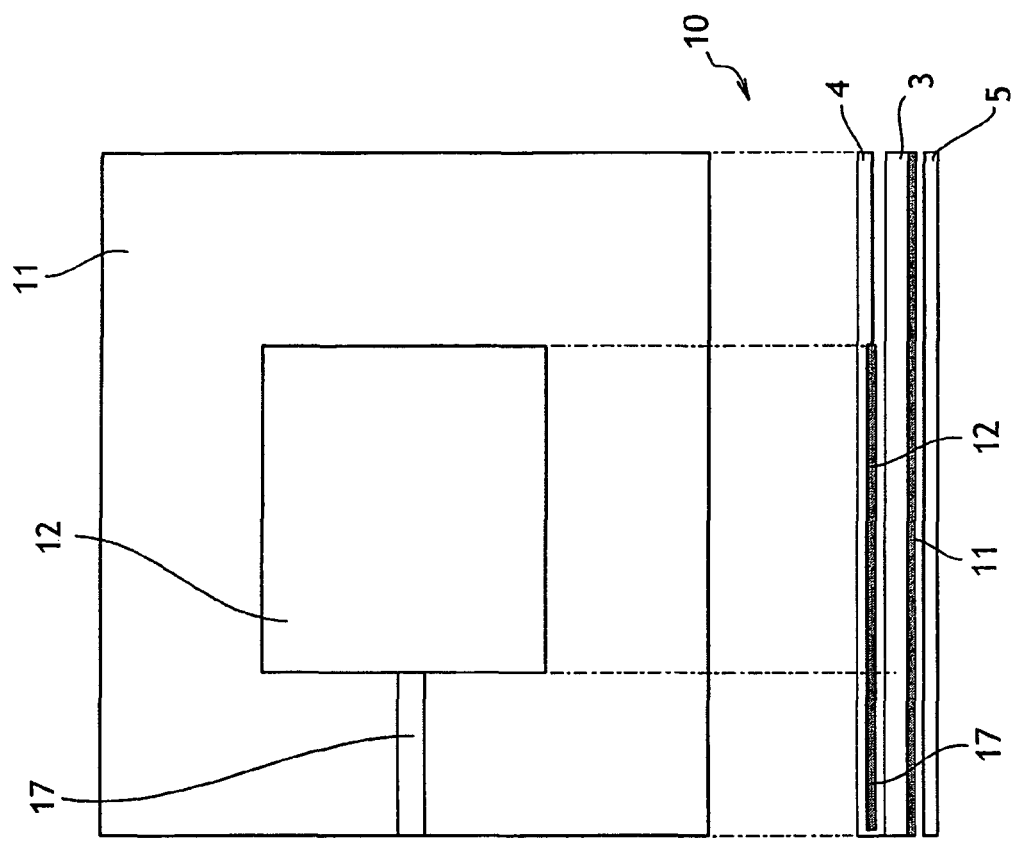
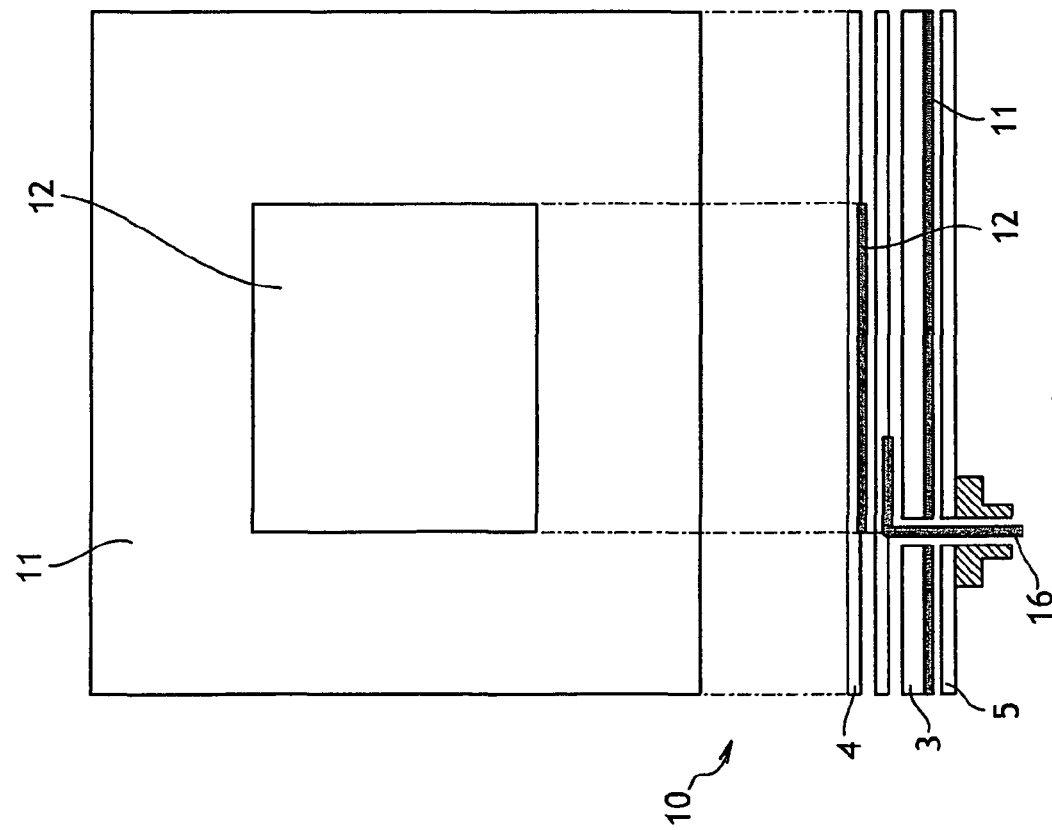

REPEATER SYSTEM WITH TRANSPARENT ANTENNA INTEGRATED INTO A GLASS PANE

The field of the invention is that of repeater systems used to relay the exchanges between a base station of a mobile telecommunication network and a user terminal.

Such systems are typically used to provide mobile telecommunication network cover in zones that are poorly covered by the base stations of the network. This mainly concerns the inside of buildings in which the electrical fields from the outside base stations are heavily attenuated. The result is that the users of the network inside such buildings are sometimes unable to use the services of the network (for example to make and receive calls).

In particular, the case of modern buildings may be observed, which use athermal glass. This type of glass effectively has a metallised layer which heavily attenuates the signal sent by the base station to the terminals inside the building, and reciprocally the signal sent by the terminals to the base station.

A repeater system typically comprises:
- an antenna positioned outside of the building, that can communicate with a base station of the network,
- an antenna positioned inside of the building, that can communicate with a user terminal,
- retransmission means provided to act as the interface between the antennae, by retransmitting (with the possibility of amplifying and regenerating) the signals received by one of the antennae destined for the other antenna.

It may be understood that such a repeater system permits the network cover to be extended to the inside of the building, so that the users inside of the building may have a good network cover.

When implementing such a repeater system, various difficulties arise however especially for the installation of the outside antenna on the building, the installation of the antenna inside the building (typically on the walls or ceilings), or even the installation of the coaxial cables connecting the various components of the system.

The purpose of the invention is to reduce these constraints in the installation of a repeater system, and it especially aims to propose a compact system that is simpler to integrate into a building.

To this end, the invention proposes a repeater system for relaying the exchanges between a base station of a mobile telecommunication network and a user terminal, comprising an outside antenna that can communicate with the base station, as well as retransmission means connected to the outside antenna, wherein the retransmission means are designed to act as the interface between the outside antenna and an inside antenna that can communicate with the user terminal to retransmit the signals received by one of the antennae destined for the other antenna, characterised in that the outside antenna is an optically transparent planar antenna integrated into an optically transparent panel used for the indoor lighting of a space.

Certain preferred but not restricted aspects of this system are as follows:
- the outside antenna comprises an earth plane, a radiating plane in the form of one or more radiating elements, and part of the panel is interposed between the earth plane and the radiating plane to form a dielectric substrate on the outside antenna;
- the earth plane and the radiating element(s) of the radiating plane are each formed by the depositing of an optically transparent conductive material;
- said material is tin oxide doped with silver (AgHT) or indium-tin oxide (ITO);
- the earth plane and the radiating plane are sandwiched between the optically transparent dielectric layers of the panel;
- the panel is made of glass;
- the panel is part of a window type construction element with an opaque frame, wherein the outside antenna has power supply means within the frame;
- the power supply means are in the form of a circuit printed onto a dielectric substrate;
- the power supply means are in the form of a power supply via a coaxial probe;
- the panel is part of a window type construction element with an opaque frame, wherein the inside antenna is integrated into the frame;
- the inside antenna is an optically transparent planar antenna integrated into the panel.

According to another aspect, the invention relates to a window type construction element into which a system according to the first aspect of the invention is integrated.

Other aspects, purposes and advantages of this invention will become clearer after reading the following detailed description of preferred embodiments of the invention, provided by way of non-restrictive example, and in reference to the appended diagrams in which:

FIG. 1 is a diagram showing a repeater system according to one possible embodiment of the invention;

FIG. 2 is a diagram showing the various components of an outside antenna according to one possible embodiment of the invention;

FIG. 3 is a diagrammatical cross section of an outside antenna according to one possible embodiment of the invention;

FIGS. 4a and 4b illustrate different possible embodiments of the power supply of an outside antenna in compliance with the invention;

Figure 5A:
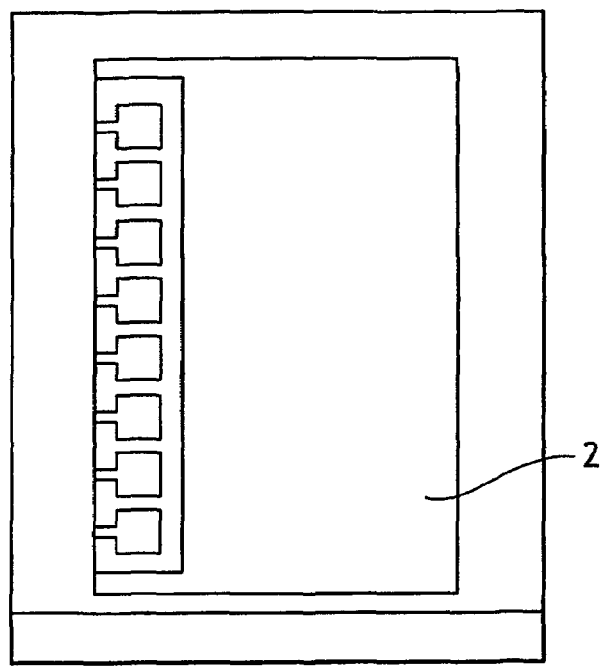
FIGS. 5a and 5b illustrate the integration of the system according to the invention in various window type construction elements.

According to a first aspect, the invention relates to a repeater system for relaying the exchanges between a base station of a mobile telecommunication network and a user terminal.

In reference to FIG. 1, the repeater system 1 comprises:
- an outside antenna 10 that can communicate with a base station (not shown) of a mobile telecommunications network;
- and retransmission means 20 connected to the outside antenna 10, wherein the means retransmission 20 are designed to act as the interface between the outside antenna 10 and an inside antenna 30 that can communicate with the terminal of a user of the telecommunication network, to retransmit the signals received by one of the antennae destined for the other antenna.

It may be understood that such a repeater system 1 permits the retransmission to the inside antenna 30 (possibly after amplification or regeneration) of the signal captured by the outside antenna 10 from a base station. This enables this signal to pass through an enclosed space, especially destined for a user terminal. Similarly, such a retransmission system 1 permits the retransmission to the outside antenna 10 (possibly after amplification or regeneration) of the signal captured by the inside antenna 30 from a user terminal located inside the enclosed space. The signal may then be retransmitted to a base station of the network.

Within the scope of the invention, the outside antenna 10 is an optically transparent planar antenna integrated into an optically transparent panel 2 used for the indoor lighting of a space.

The space for which the panel 2 provides the indoor lighting is typically a building type space, for automobiles or trains, etc.

In the following description, the example of a building will be used. It may be understood however that the invention is not restricted to this example, but includes any spaces for which the indoor lighting is provided by means of an optically transparent panel.

The panel 2 is typically part of a window type construction element, of which it forms what is commonly called the "glass".

According to one possible embodiment of the invention shown in FIGS. 2, 3, 4a and 4b, the outside antenna 10 is a planar antenna of the printed antenna type. The antenna 10 has an earth plane 11, a radiating plane 12 in the form of one or more radiating elements 12-15 (these elements, also called patches, are of course not limited to four), and a dielectric substrate interposed between the earth plane 11 and the radiating plane 12.

One part 3 of the panel 2 is used to form the dielectric substrate of the outside antenna, so that the outside antenna 10 is integrated into the panel 2.

It may be noted that the part 3 of the panel 2 may be a physical layer of the panel 2, for example a layer of glass, or even a vacuum layer, for example when the panel 2 is a double glazed type structure.

Furthermore, the earth plane 11 and the radiating plane 12 may be sandwiched between the optically transparent dielectric layers 4, 5 of the panel 2, in order to obtain the stacked structures shown in FIGS. 3, 4a and 4b.

The layer 5 faces towards the inside of the building, whereas the layer 4 faces towards the outside of the building. The layer 5 thus supports the earth plan 11 of the outside antenna, whilst the layer 4 covers the radiating plane 12 of the outside antenna.

The panel 2 is typically made of glass. The panel 2 may however be formed from any other optically transparent dielectric material, for example Plexiglas.

It may be observed here that the panel 2 may be formed by a layer of a different nature. In particular, athermal glass may be used (comprising as seen a radio electrically opaque metallised layer) for the layer 5 supporting the earth plane 11 (which further permits the shielding of the earth plane to be strengthened), and an electrically transparent radio glass for the layer 4 so as to ensure the free radiation of the outside antenna towards the outside.

The earth plane 11 and the radiating element(s) 12-15 of the radiating plane 12 are each formed by the depositing of an optically transparent conductive material on a plastic film, for example on a polyester film. The optically transparent conductive material may also be deposited directly onto the panel by etching processes.

This typically involves a very thin metallic deposit, around a few microns thick.

In reference to the embodiment of FIG. 3, the part 3 of the panel 2 acting as the dielectric substrate interposed between the radiating element 12 and the earth plane 11 has a thickness of 6 mm. The layers 4, 5 of the panel sandwich the radiating element structure 12/dielectric substrate 3/earth plane 11 each with a thickness of 3 mm. These thicknesses are of course purely provided by way of example.

Within the scope of the invention, by "conductive" material it is meant a material that is substantially conductive with a resistivity of less than 10 ohm/squared, preferably less than 5 ohm/squared.

Furthermore, by "optically transparent" material, it is meant a material that is substantially transparent to visible light, allowing at least 30% of this light to pass, and preferably more than 60% of the light.

The optically transparent conductive material is preferably, without this being restrictive, indium-tin oxide (ITO), tin oxide doped with silver (AgHT), or any other metallic material. It may be observed that the AgHT material is a transparent material with a resistivity of around 4 ohm/squared.

As the radio-electrical losses are directly linked to the resistivity of the material, within the scope of one preferred embodiment of the invention, it is proposed to reduce the losses of the outside antenna, and consequently to optimise its gain, by preferring the use of square radiating elements (that have especially been verified to ensure that their resistivity is lower than that of a rectangular radiating element).

Of course, when the panel 2 forms the glass of a window of a building, the radiating plane 12 of the outside antenna 10 is positioned on the side of the panel that is facing towards the outside of the building.

As shown in FIG. 4a, the power supply of the radiating element(s) 12-15 of the outside antenna 10 may be made from a coaxial probe 16.

The core of the coaxial probe opens only onto an orifice in the earth plane 11 and excites the outside antenna by direct contact with the edge of the radiating plane 12, or (as shown in FIG. 4a) by electromagnetic coupling with the aid of a section (extension of the central core) towards the inside and parallel to the radiating plane.

It is pointed out that within the scope of the invention that by "coaxial probe power supply", it is meant any power supply circuit of a radiating element or a network of radiating elements formed by coaxial cables terminated by one or several coaxial excitation probes of the radiating element(s).

As a variant, as shown in FIG. 4b, the power supply of the radiating element(s) of the outside antenna may be made using a micro-ribbon line 17. In this case, a line 17 made of AgHT or ITO, and with a width that is much narrower than the dimension of the antenna, is used to provide the energy directly to the edge of the outside antenna and thus power it. This line 17 is positioned in the same plane as the radiating plane 12.

According to one preferred embodiment of the invention, and in reference to FIGS. 1 and 2, the panel 12 is part of a window type construction element with an opaque frame 6, and the power supply means of the antenna are fitted inside the frame 6.

The fitting of the power supply means 16—especially when this concerns power supply means in the form of a micro-ribbon line 17—in the opaque frame is very efficient from a radio-electrical point of view. A power supply line printed onto a dielectric substrate (for example duroid, epoxy glass) effectively has low losses, which is especially favourable for the gain of the antenna.

The power supply line may also be designed on a transparent material. However for this variant, induced losses (due to the material, the lengths of the lines, and above all the rectangular forms of the arborescence of the line for the power supply of several radiating elements; this arborescence is shown in FIGS. 1 and 2) currently provide lower performances than the gain of the antenna network.

As concerns the performance of the outside antenna, purely by way of example it may be pointed out that an outside antenna according to the invention powered by a coaxial probe permits a reflection coefficient to be obtained of less than −10 dB for the entire GSM band. The measured gain is close to −3.5 dBi.

An antenna operating at the same frequency and powered by a printed micro-ribbon line has a gain of around −12 dBi, which is to say a gain of around −8.5 dB less than the gain of the antenna powered by a coaxial probe. This difference is due to the losses from the micro-ribbon line powering the antenna.

Figure 5B:
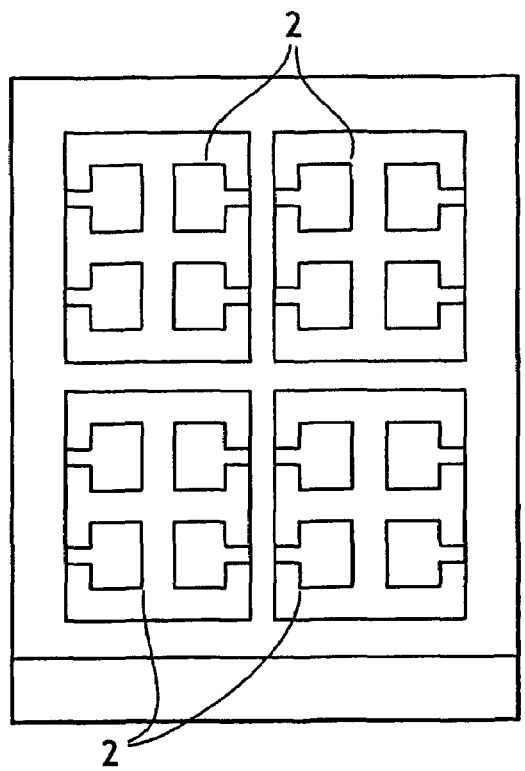

As may be seen from FIGS. 5a and 5b, the invention offers the advantage of being able to adapt to different window structures.

Thus FIG. 5a shows a window with a single panel 2, and FIG. 5b shows a "paned glass" window with several panels 2. It may be understood that the paned glass window has the advantage of permitting the integration of quite a high number of radiating elements, especially when the power supply means are integrated into the vertical posts of the window.

It is pointed out, without this being restrictive, that the target size for the outside antenna is that of an ordinary window, which is to say with a height of between 1 m and 1.5 m.

According to one possible embodiment of the invention shown diagrammatically in FIG. 1, the inside antenna 30 and the retransmission means 20 are traditional elements, that are preferably small, integrated into the frame 6 of the window.

The inside antenna 30 may thus be a "dipole" type antenna integrated into the vertical post of the window.

The inside antenna 30 may however be made similarly to the outside antenna 10, by providing a planar antenna integrated into the panel 2. In this case, it is obvious that the radiating element(s) of the inside antenna 30 are located on the side of the panel that is facing towards the inside of the building.

The retransmission means 20 are of the "micro-repeater" type device, with a selective band operating in the band of the mobile telecommunication network by type of band: GSM, DCS or UMTS and by bandwidth (channels concerned).

One example of a micro-repeater device that may be used in the E-GSM band to form the retransmission means 20 of the invention is the MIKOM RF MR 303B EGSM repeater system.

According to one possible embodiment of the repeater system according to the invention, the inside antenna is offset from the panel using an output connector after the retransmission means 20. Such an embodiment is advantageous when the space to be provided with the electrical radio coverage is not within immediate proximity of the panel 2.

According to another possible embodiment, the retransmission means are offset from the panel using an output connector after the outside antenna. This embodiment is especially advantageous for window frames that are too small to accommodate said retransmission means.

It may be understood that the invention is not limited to a repeater system as previously described, but also extends to a window type construction element in which a system according to the first aspect of the invention is integrated.

The invention claimed is:

1. Repeater system (1) for relaying the exchanges between a base station of a mobile telecommunication network and a user terminal, comprising an outside antenna (10) that can communicate with the base station, as well as retransmission means (20) connected to the outside antenna, wherein the retransmission means (20) are designed to act as the interface between the outside antenna (10) and an inside antenna (30) that can communicate with the user terminal to retransmit the signals received by one of the antennae destined for the other antenna, wherein the outside antenna is an optically transparent planar antenna integrated into an optically transparent panel (2) used for the indoor lighting of a space, the outside antenna comprising an earth plane (11) and a radiating plane in the form of one or several radiating elements (12-15), the earth plane (11) and the radiating element(s) (12-15) of the radiating plane are each formed by depositing an optically transparent conductive material, and wherein the panel is part of a window type construction element having an opaque frame (6), inside which a power supply is fitted for electro-magnetically exciting for the one or several radiating elements of the outside antenna.

2. System according to claim 1, in which the panel comprises three layers made of glass:

a first layer (3) interposed between the earth plane (11) and the radiating plane (12-15) to form a dielectric substrate of the outside antenna; and a second layer (5) on the earth plane and a third layer (4) on the radiating plane, the second layer and the third layer thereby sandwiching the earth plane, the first layer and the radiating plane.

3. System according to claim 1, in which said material is tin oxide doped with silver (AgHT) or indium-tin oxide (ITO).

4. System according to claim 1, in which the power supply (16) is in the form of a circuit (17) printed onto a dielectric substrate.

5. System according to claim 1, in which the power supply is in the form of a power supply by coaxial probe (16).

6. System according to claim 1, in which the inside antenna (30) is integrated into the frame.

7. System according to claim 1, in which the inside antenna (30) is an optically transparent planar antenna integrated into the panel (2).

8. Window type construction element having an optically transparent panel used for the indoor lighting of a space and an opaque frame, further comprising an outside antenna of a system according to claim 1 integrated in the optically transparent panel and power supply means for the outside antenna fitted inside the frame.

9. System according to claim 2, wherein the second layer (5) is made of athermal glass.

10. System according to claim 2, wherein the third layer (4) is made of radio electrically transparent glass.

11. Repeater system (1) for relaying the exchanges between a base station of a mobile telecommunication network and a user terminal, comprising an outside antenna (10) that can communicate with the base station, as well as retransmission means (20) connected to the outside antenna, wherein the retransmission means (20) are designed to act as the interface between the outside antenna (10) and an inside antenna (30) that can communicate with the user terminal to retransmit the signals received by one of the antennae destined for the other antenna, wherein the outside antenna is an optically transparent planar antenna integrated into an optically transparent panel (2) used for the indoor lighting of a space, the outside antenna comprising an earth plane (11) and a radiating plane in the form of one or several radiating elements (12-15), the earth plane (11) and the radiating element(s) (12-15) of the radiating plane are each formed by depositing an optically transparent conductive material, and wherein the panel is part of a window type construction element having an opaque frame (6), inside which a power supply is fitted for electro-magnetically exciting one or several radiating elements of the outside antenna, in which the panel comprises three layers made of glass:
- a first layer (3) interposed between the earth plane (11) and the radiating plane (12-15) to form a dielectric substrate of the outside antenna; and
- a second layer (5) on the earth plane and a third layer (4) on the radiating plane, the second layer and the third layer thereby sandwiching the earth plane, the first layer and the radiating plane, in which the power supply (16) is in the form of a circuit (17) printed onto a dielectric substrate, in which the inside antenna (30) is an optically transparent planar antenna integrated into the panel (2).

* * * * *

UNITED STATES PATENT AND TRADEMARK OFFICE
CERTIFICATE OF CORRECTION

| | |
|---|---|
| PATENT NO. | : 8,634,764 B2 |
| APPLICATION NO. | : 12/148995 |
| DATED | : January 21, 2014 |
| INVENTOR(S) | : Eduardo Motta Cruz et al. |

It is certified that error appears in the above-identified patent and that said Letters Patent is hereby corrected as shown below:

In the Claims, Column 6, Claim 1, line 19, please delete "for the".

Signed and Sealed this
First Day of July, 2014

Michelle K. Lee
*Deputy Director of the United States Patent and Trademark Office*